United States Patent Office 3,370,319
Patented Feb. 27, 1968

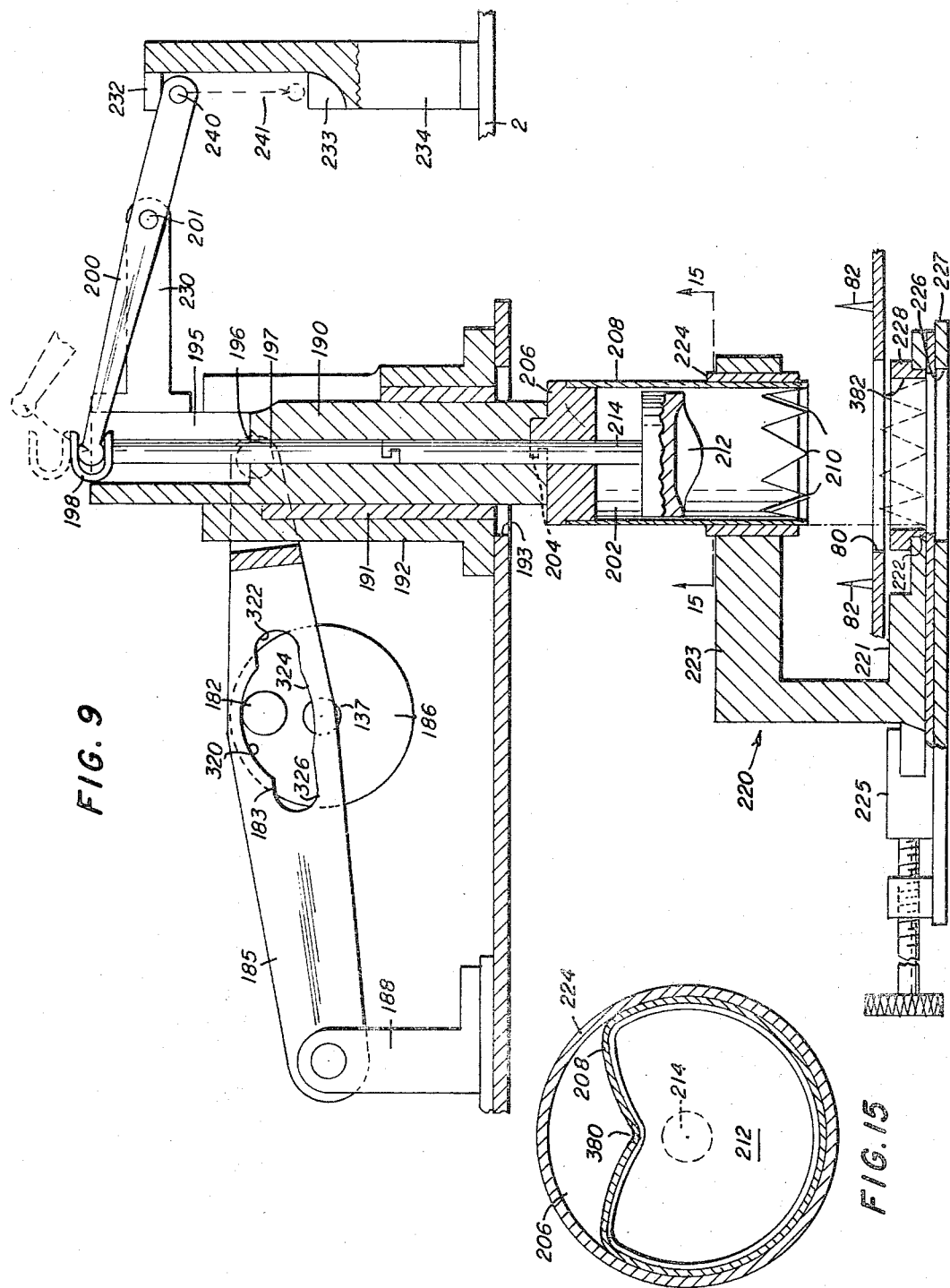

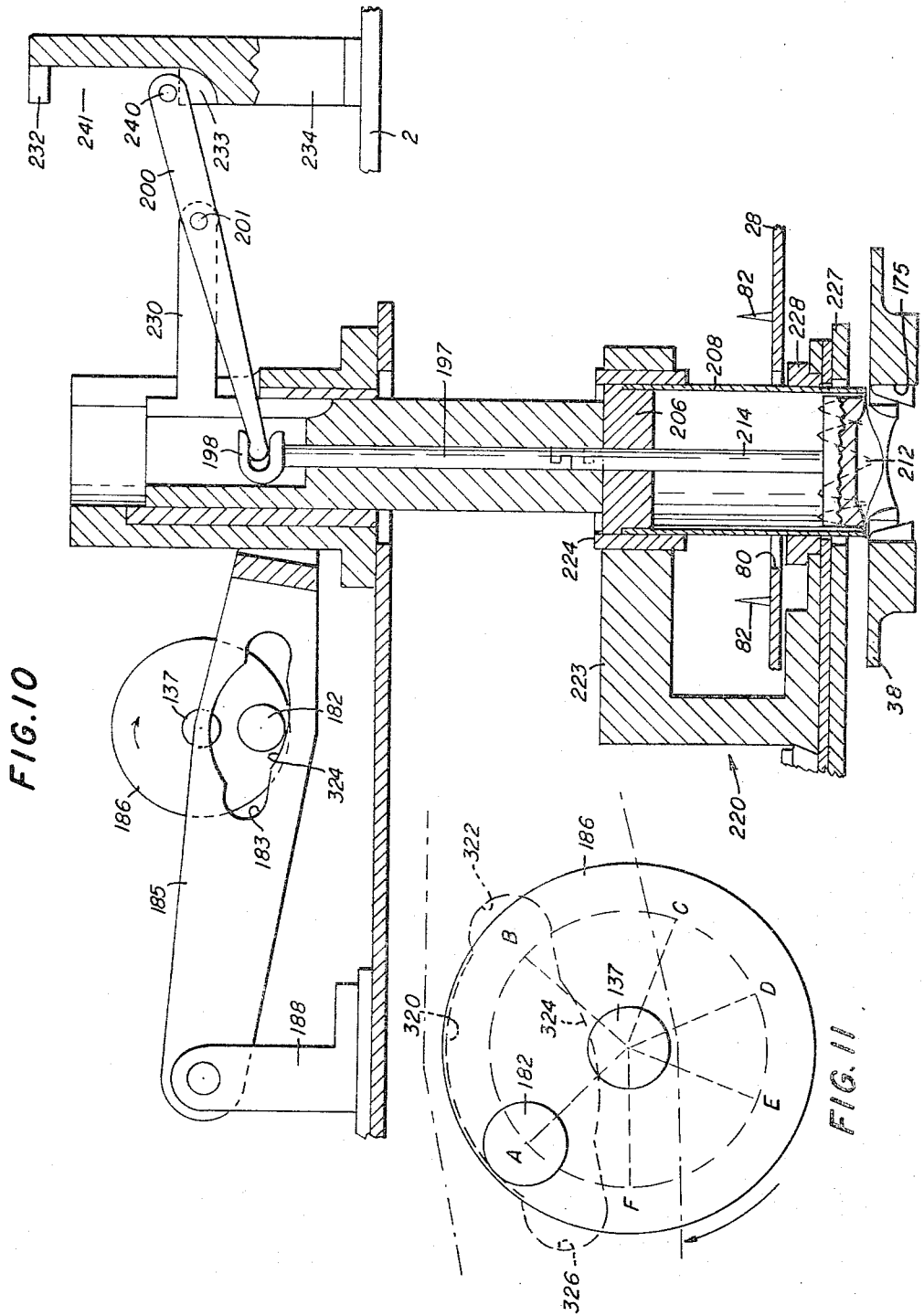

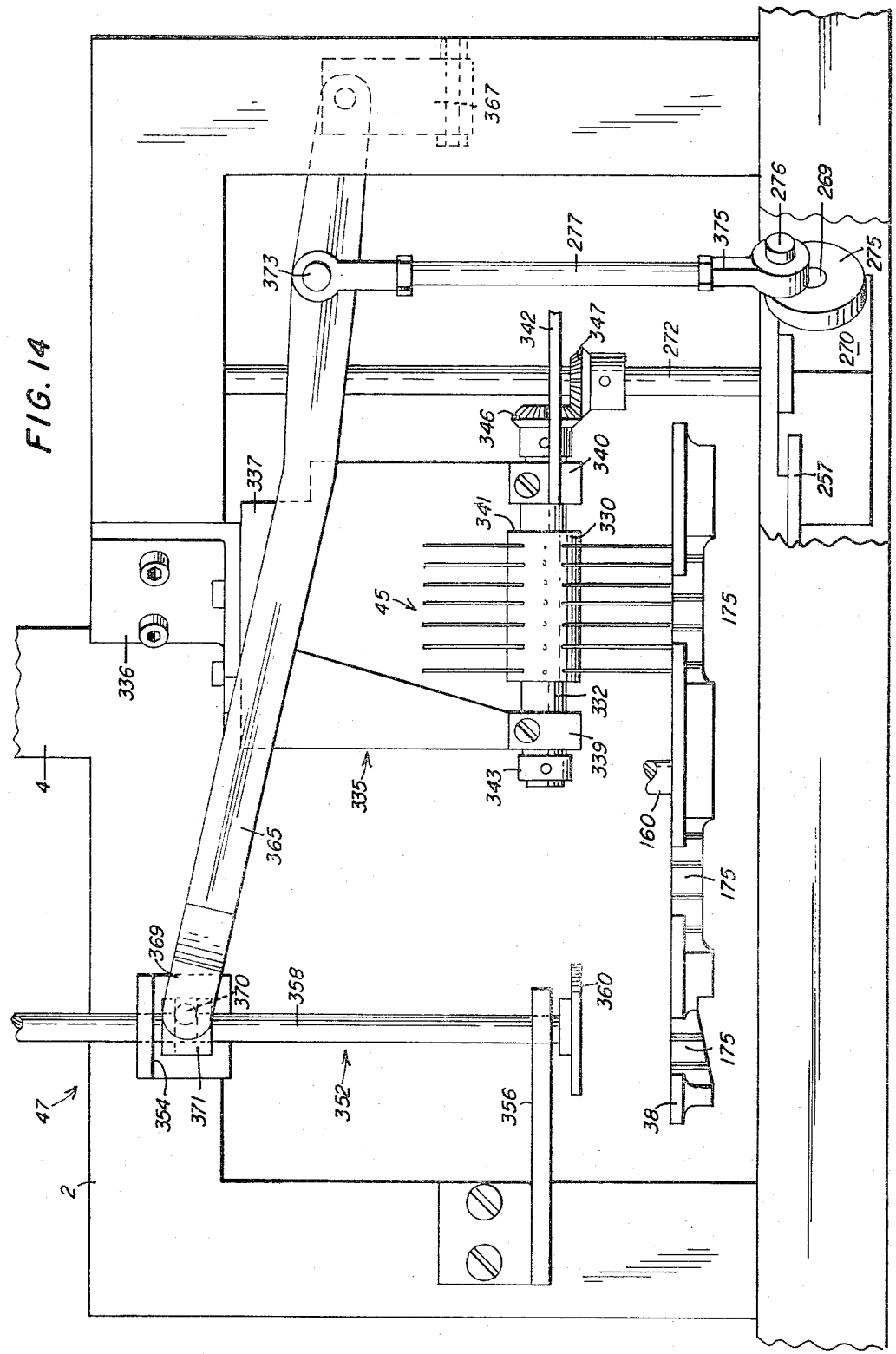

3,370,319
CRAB PROCESSING APPARATUS
Daniel E. Houghton and Emmett F. Deady, Arlington, Va., assignors to the United States of America as represented by the Secretary of the Interior
Filed Oct. 21, 1965, Ser. No. 500,456
15 Claims. (Cl. 17—2)

ABSTRACT OF THE DISCLOSURE

Crab processing wherein clean crab cores are produced by a cyclically sequenced apparatus having a crab carrier and crab transfer mechanism synchronously rotatable on separate axes driven together for operation concurrently with crab rendering devices which function in openings and recesses in the carrier and mechanism at stations around the apparatus. At a first of these stations a crab is properly oriented in an opening for subsequent processing, and in this opening at a second station a cardioid shaped crab core is punched out and displaced to a recess wherein the core is cleaned of its carapace and viscera. At a third station the core in the recess is further cleaned of its ventral covering, and transferred to a fourth station whereat the core is dislodged from the recess into a container therefor.

---

This invention relates to an apparatus for processing crabs. More particularly, the apparatus automatically debacks, and removes ventral shells and viscera from previously steamed crabs such that the more valuable edible parts of these crabs are exposed and thereby made accessible for extraction from the remaining portion of the crabs in a most efficient and economical manner.

As is well known, "backfin" crab meat is marketable at the highest prices since it may be obtained from the crabs in more desirable large segments or lumps generally free from shell splinters. Automatic crab processing machinery previously used to pick lump meat usually shredded some of this meat and as a result diminished its market value. Employing manual labor to pick meat from crabs was therefore considered expedient in the past since the lump meat could thereby be taken from the crabs most effectively. In the apparatus of the present invention, each crab is handled by automatic devices so as to preserve the integrity of the lump meat while cleaning away shell and tissue structures of the crab which naturally obstruct the removal of the lump meat. Since the lump meat is thus made easily accessible, it can be readily picked as complete lumps by other automatic or semi-automatic devices. Moreover, the instant apparatus is structurally compact and rugged, and can be operated in a rapid and continuous manner to facilitate quantity production whereby its utilization in place of hand labor becomes economically feasible in processing plants of all sizes. The apparatus is also readily adaptable to importantly improve crab processing systems and arrangements presently used in plants producing crab meat for commercial markets.

Crabs supplied for processing in the present apparatus are inspected before cooking to determine their fitness as food, wherefore dead crabs are culled and discarded. Inspections of the crabs are also made at various other points in their porcessing to insure that no unfit meat remains as a final product. After the crabs are cooked, in a manner well known in the art, they are dumped upon sorting tables where the crabs are segregated by size and prepared for input to the apparatus by removing their claws. A conveyor, having one edge disposed adjacent the sorting tables and leading to the primary input structure of the apparatus, is loaded by hand with the declawed crabs in a manner to be hereinafter more fully explained. On being received in the apparatus from the conveyor, each crab is aligned in a predetermined position on a rotary conveying device, and releasably secured thereto. This device carries the crab to a punch station whereat the body of the crab is trimmed to a core which is thereafter transferred to a further rotating conveyor wherein one side of the core is cleaned of its shell and viscera. When the core is subsequently transferred to a following station it is positioned to have its other side cleaned of shell and tissue and made ready for disposal from the apparatus at a still further station.

A principal object of the present invention is therefore to provide an automatically operable apparatus for cleaning and additionally preparing steamed crabs so as to allow a more effectual picking of crab meat therefrom.

Another object of the invention is to provide a high speed crab processing apparatus which is operable in a continuous manner to produce crab cores from which "backfin" lump meat can be readily extracted.

Another object of the invention is to provide a cyclically operable crab processing apparatus having a plurality of crab manipulating devices which are concurrently effective during each cycle of operation to progressively modify the form of crabs automatically conveyed therethrough.

Another object of the invention is to provide a crab processing apparatus wherein crabs are made secure from movement in intermittently operable transport devices which sequentially position the crabs at separate processing stations in the apparatus.

Another object of the invention is to provide for use in a crab processing apparatus, crab punching and cleaning devices that are readily removable and replaceable for maintenance or modification.

A further object of the invention is to provide for use in a crab processing apparatus a crab punching device supporting an interchangeable, spacially contoured punch element which cuts a crab core of predetermined form.

These and other objects and advantages of the present invention will become more fully apparent from the following detailed description of the invention set forth herein and from the accompanying drawings made a part hereof in which:

FIG. 9 is a cross-sectional view of the crab coring punch and punch stripper mechanism with parts shown positioned as they are in an initial phase of an operational cycle of the apparatus;

FIG. 10 is a cross-sectional view similar to that of FIG. 9, but with parts shown positioned as they are at the end of the punch and core transfer phase of the operational cycle of the apparatus;

FIG. 11 is a diagrammatic illustration of the operational phases which define the action of the control members of the punch and punch stripper mechanism of the apparatus during an operational cycle thereof;

Figure 12:
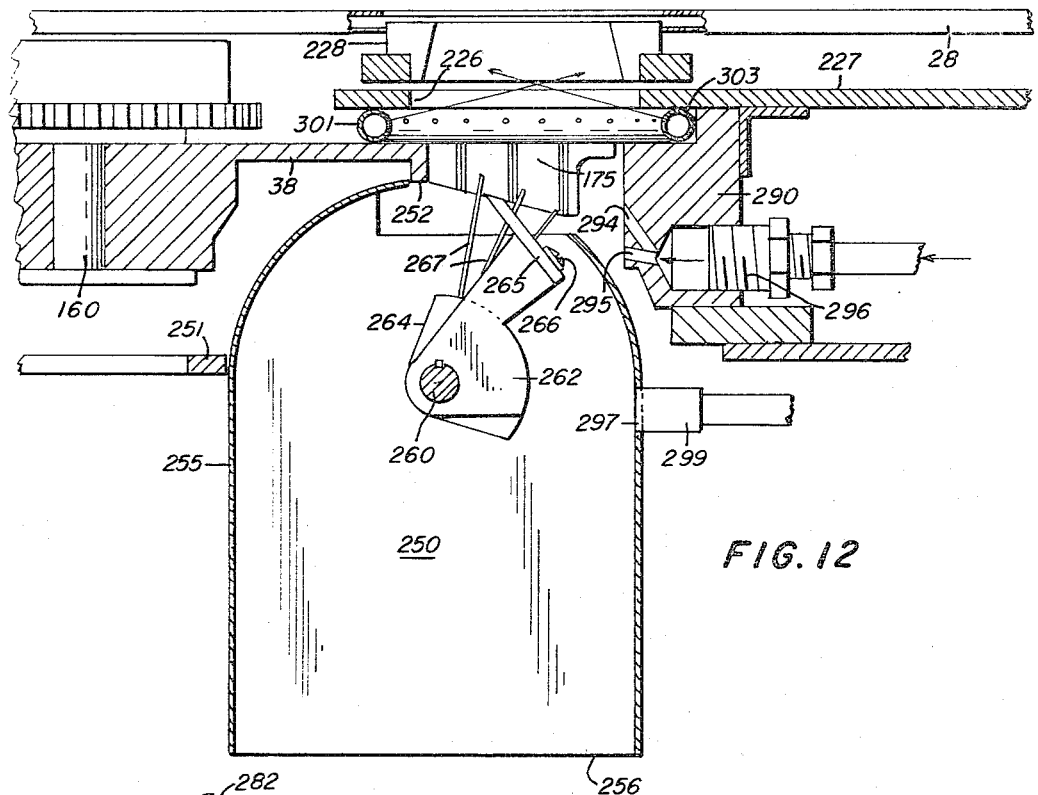
FIG. 12 is a view partly in section of a viscera cleanout knife and brush mechanism shown operatively associated with a transfer table recess at the crab coring station.
Figure 13:
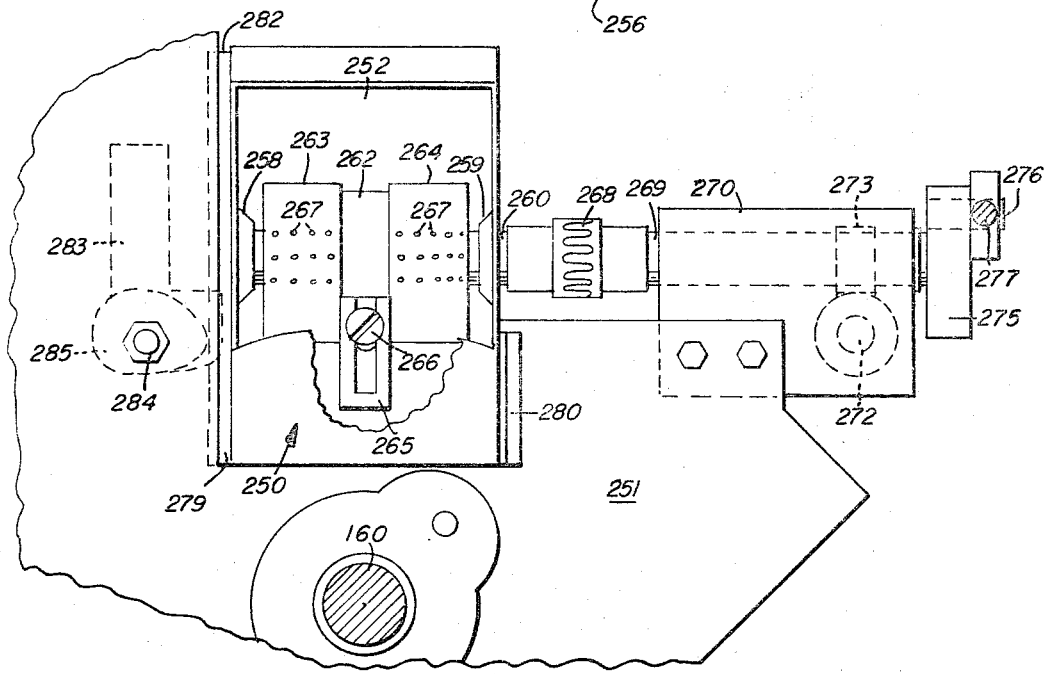

FIG. 13 provides a partial top plan view of the clean-out mechanism shown in FIG. 12, and includes a showing of the actuating drive for the clean-out mechanism;

FIG. 14 is an elevational view showing details of ventral shell cleaning brush and crab core knock-out mechanisms; and FIG. 15 is a sectional view, taken along line 15—15 in FIG. 9, wherein is shown a preferred form of punch assembly members having utility in the punch and punch stripper mechanism of FIGS. 9 and 10.

*General description*

Figure 1:
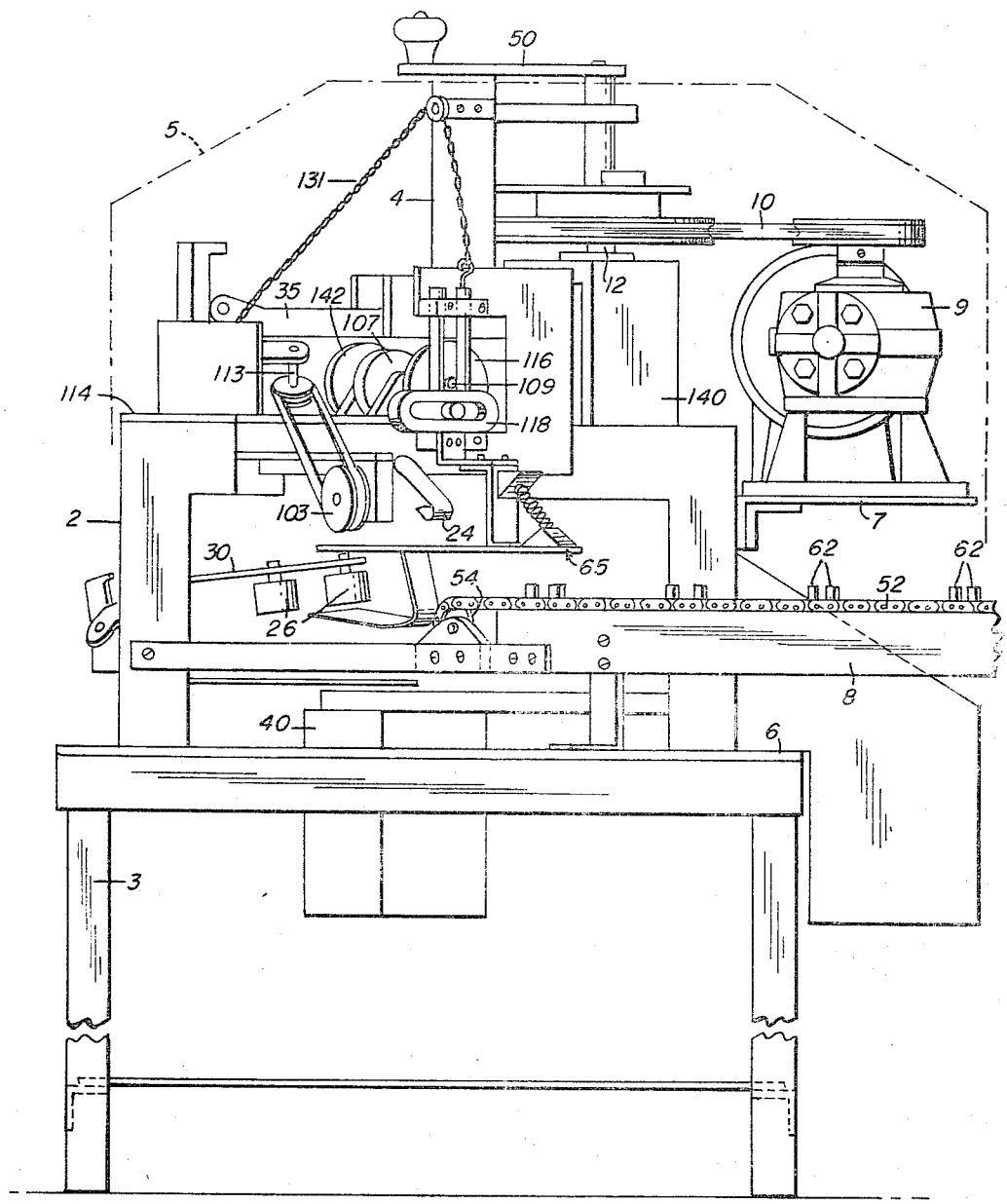
FIG. 1 is a side elevational view of the overall apparatus according to the present invention.
Figure 2:
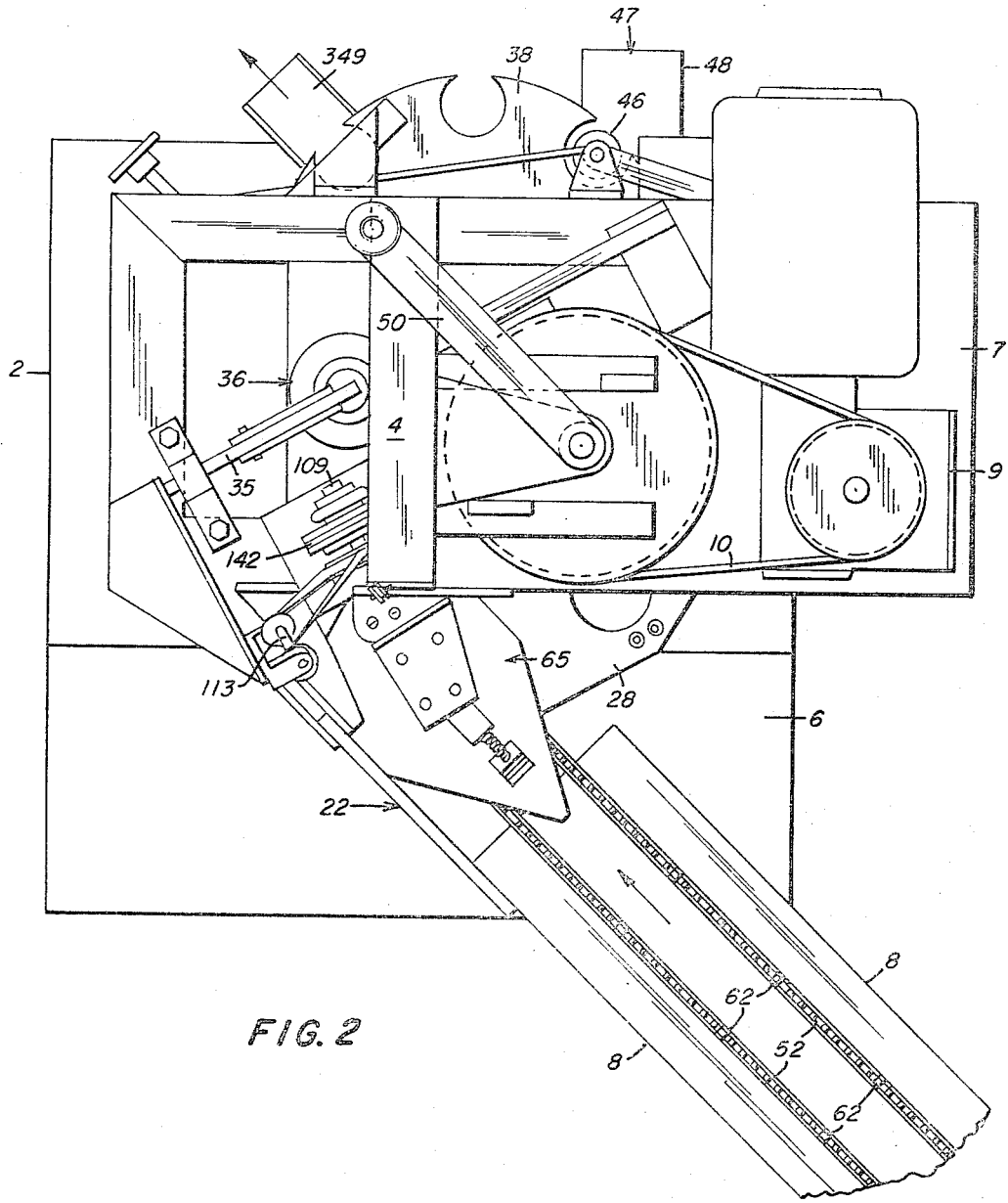
FIG. 2 is a top plan view of the apparatus as shown in FIG. 1.

Referring to FIGS. 1 and 2, the apparatus according to the present invention is seen to involve an interrelated combination of mechanisms arranged and supported within a partial enclosure 2 which is fixed to the top of a base or floor stand 3. Enclosure 2 is essentially a composite of L-shaped structural steel members welded together to form a frame to which the various mechanisms are screwed or bolted in working relationship to each other. A centrally disposed upright frame 4 is additionally provided to support several components situated at the upper part of the apparatus, and furnish an attaching surface for a covering hood 5 shown by broken lines in the drawing. A pair of overhanging shelves 6 and 7 are separately fixed to the stand and housing as integral parts thereof, to support a crab feed or input conveyor 8, and a motor and gear box structure 9, respectively, in positions where they can be suitably fastened to the apparatus for operative association with particular mechanisms therein as will be hereinafter more fully described.

The driving power from motor structure 9 is delivered by way of a pulley system 10 to a main shaft 12 which through gearing and linkage trains supplies an operative drive to the aforesaid combination of mechanisms. Among the mechanisms which are made concurrently effective by these power trains are conveyor 8, which carried crabs up to a loading station 22 of the apparatus, a crab pusher mechanism 24 which in cooperation with a pantographic roller device 26 functions to orient each incoming crab with respect to a prelocated work area on a feed table 28, a crab hold-down or setting mechanism 30 which compels the oriented crab into a fixed position relative to feed table 28, a punch and stripper mechanism 35 which is activated at crab coring station 36 to cut a core out of the crab positioned thereunder by feed table 28 and displace this core down into a transfer table 38, a knife and brush mechanism 40 which acts at coring station 36 to remove the carapace and viscera from the back of the crab core, a cleaning brush 330, at a further processing station 45, shown in FIG. 14, which removes the ventral shells from the crab core, and a knock-out mechanism 46 which functions at a crab core discharge station 47 to punch a cleaned core out of transfer table 38 and into a discharge chute 48. A hand crank 50, releasably connected to main shaft 12, is provided to facilitate incremental operation of the driving connections whereby particular devices and elemental parts of the apparatus can be precisely located to allow accurate adjustments or servicing of the apparatus.

*Crab input conveyor*

Figure 3:
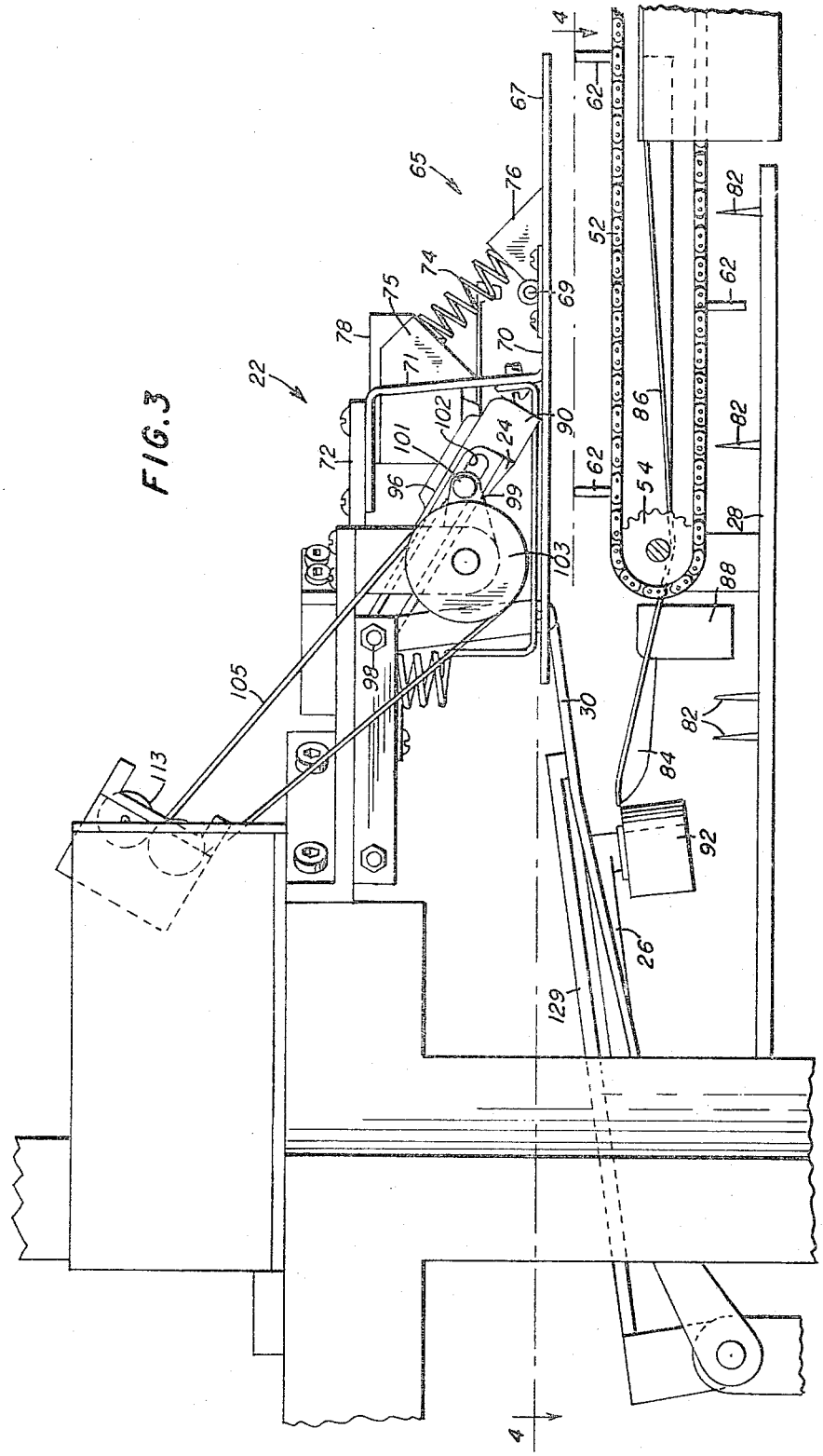
FIG. 3 is an elevational view of crab conveyor and feed handling devices at the input station of the apparatus.
Figure 4:
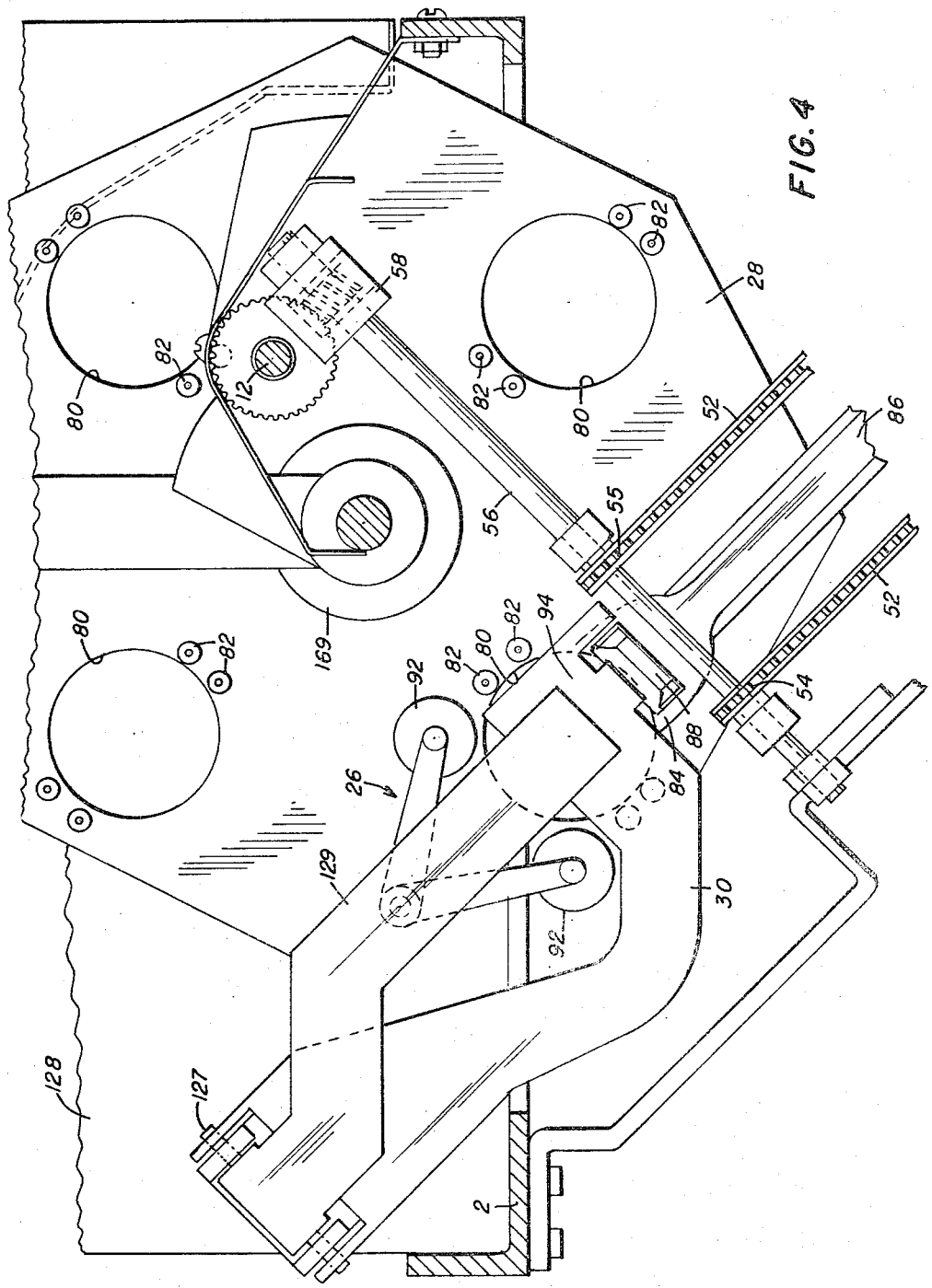
FIG. 4 is a plan view, taken along line 4—4 in FIG. 3, showing details of conveyor drive and crab aligning devices for the feed table at the input station of the apparatus.

Conveyor 8 becomes operative when a pair of endless sprocket chains 52 start to translate over a pair of supporting angles with idler sprockets at the outer end of conveyor 8. A pair of sprockets 54 and 55, on the conveyor structure disposed within crab loading station 22, as shown in FIGS. 3 and 4, is driven by main shaft 12 by way of a secondary shaft 56 and a spiral gear connection 58 at the lower end of the main shaft. Accordingly, sprocket pair 54 and 55 acts to drive the conveyor. At equally spaced intervals along the full extent of chains 52, are fixed stud-like, outwardly pointing pins 62. When loading the conveyor crabs are placed thereon ventral side up and set down so as to situate pins 62 immediately ahead of the knuckles on the back or swim fins of the crab. The crabs are thus maintained on the conveyor in the predetermined spacial relationship required for properly releasing them from the conveyor for disposition into the mechanisms at loading station 22 of the apparatus.

*Crab loading station*

Figure 6:
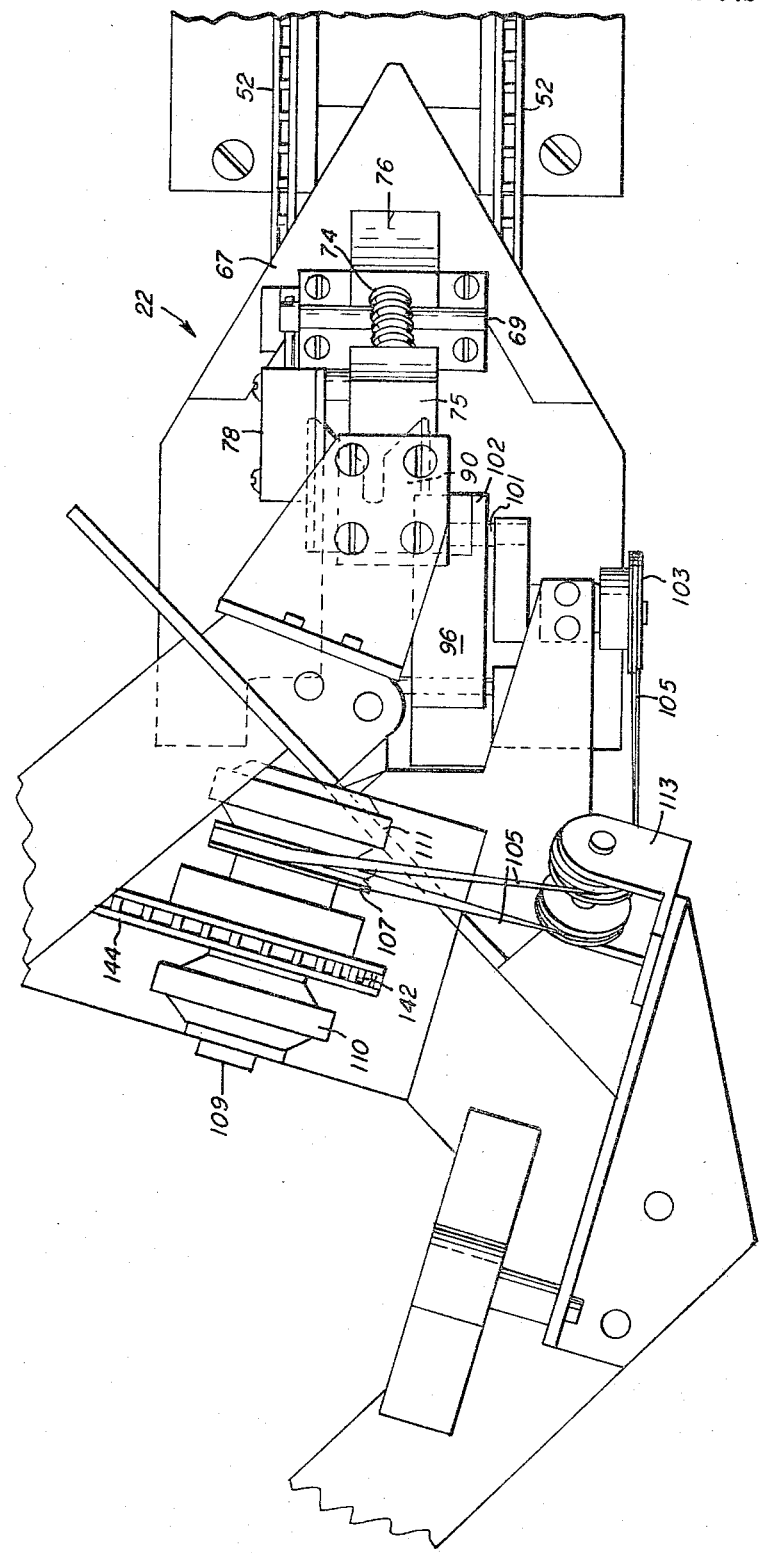
FIG. 6 is a top plan view showing details of power transmitting elements including sprocket and chain connections supplying an actuating drive to the crab aligning and emplacing devices shown in FIGS. 3, 4 and 5.

Crabs brought to loading station 22 by conveyor 8 are tested for size by a height detector mechanism 65. As best seen in FIGS. 2, 3 and 6, the mechanism comprises a generally triangular flap 67 which is arranged to overlie a short portion of the conveyor structure extending rearwardly of its discharge end. Flap 67 is pivotally connected by a hinge 69 which allows movement of the flap only upwardly from its normal horizontal position which occurs when the bulk of an oversized crab on the conveyor is brought against the under side of the flap. The stationary part of hinge 69 is fastened to a support plate 70 suspended from enclosure 2 to overlie the discharge end of the conveyor. An opening in plate 70 extends rearwardly under a step-like segment 71 projecting out of the plate and to which attaches a support bracket 72. Flap 67 is urged downwardly so as to assume a normal sensing position by a compressed coil spring 74 whose ends fill pockets formed in blocks 75 and 76 fixed to step 71 and flap 67, respectively. A microswitch unit 78 having normally closed contacts in a circuit controlling the circuit supplying electricity to the motor of power input structure 9, is located contiguous to plate 70 whereat it can be actuated by a rearward extension on flap 67 when the latter is lifted any substantial amount against the compression of spring 74. Since all operating drives in the apparatus are derived from the motive power of structure 9, it should be evident that motor switch control flap 67 is operable to effectively prevent the delivery for processing in the apparatus any crab of such size as would life the flap, and would have given rise to a misoperation.

Crabs of acceptable sizes are brought past flap 67 by conveyor 8 to the forward end thereof from which the crabs are mechanically manipulated one after another to set upon predetermined places arranged around a feed table 28. Referring particularly to FIGS. 3 and 4, table 28 is seen as an octagonal plate-like structure wherein four openings 80 are symmetrically disposed so as to be located adjacent alternate corners of the table. Secured to table 28 arranged about diametrical lines through its openings 80, and contiguous to opposite edges of the openings, are pairs of upstanding spikes 82. As will be hereinafter more fully explained, table 28 is driven in an intermittent fashion to sequentially place its openings in alignment with the delivery end of conveyor 8 so as to receive crabs therefrom. However, each crab leaving the conveyor is initially intercepted by a spoon-like receptacle 84 which becomes superimposed over each opening 80 as it is brought to loading position at station 22. Crab interceptor 84 is at the end of an elongated flexible arm 86 which passes under and between conveyor drive sprockets 54 and rearwardly between conveyor chains 52, and attaches to conveyor stand 60. A stop block 88, adjustably secured to the conveyor stand, passes through an opening in interceptor 84 so as to locate downwardly inclined surfaces of the block in position to contact the dorsal end of a crab received on the interceptor which is thus flexed down to closely approach the edge of feed table opening 80 thereunder. Proper placement of the crab over opening 80 is brought to completion by the interaction of pusher mechanism 24, pantographic orienter 26, and placement mechanism 30, upon the crab then being held relatively loosely on interceptor 84 and against stop block 88.

In accomplishing the aforesaid interaction, pusher mechanism 24 functions to rotate its pusher arm 90 downwardly so that vertically disposed, spaced-apart, petal-like elements fixed to its swinging end strike the dorsal end of the crab and drive it forward until the frontal rim of the crab bears against orienting rollers 92 of pantograph 26, and the dorsal end bears against inclined surfaces of stop 88. Emplacement mechanism 30 thereupon becomes effective to firmly secure the oriented crab over feed table opening 80 by swinging its forwardly disposed foot 94 downwardly upon the ventral surface of the crab whereby interceptor 84 is flexed through opening 80, and the crab thereon is forcibly moved against spikes 82 which penetrate its carapace. As a crab is being secured to feed table 28 under downwardly moving emplacement foot 94, pusher mechanism 24 and pantographic orienter 26 are drawn upwardly away from the feed table surface. While emplacement mechanism 30 holds the crab down on spikes 82, feed table 28 starts to rotate clockwise, as viewed in FIG. 4. The crab is thus drawn from interceptor 84, which flexes upwardly to initial position, as shown in FIG. 3, to overlie the next feed table opening 80 coming around into alignment with the delivery end of conveyor 8.

*Apparatus drive arrangement*

Figure 5:
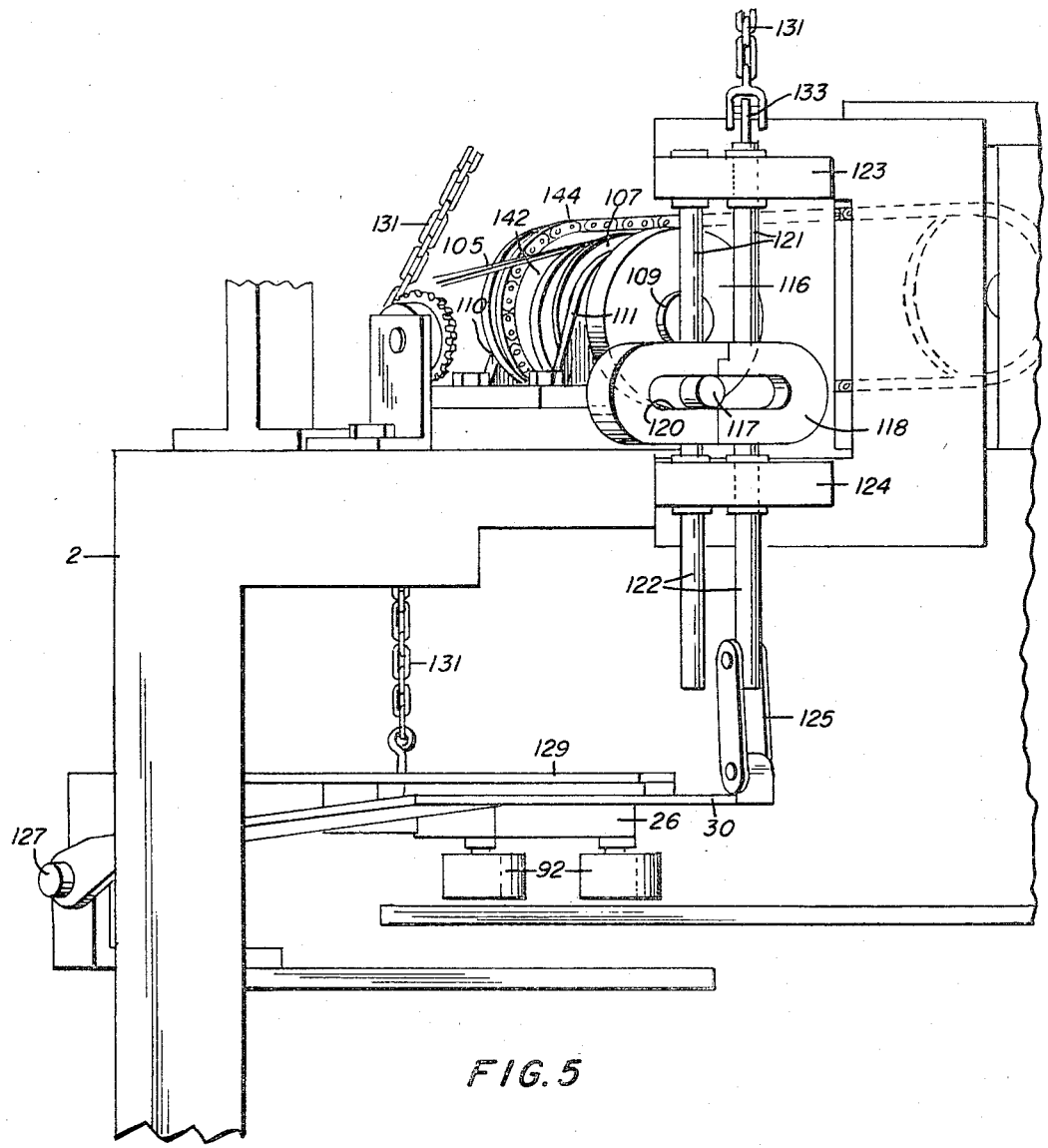
FIG. 5 is an elevational view showing details of a crab emplacing mechanism at the input station of the apparatus.

Comprising the drive means for pusher mechanism 24, whose pusher arm 90 is oscillated by reason of its attachment to the extended end of a lever 96 pivotally supported on a shaft 98, are a rotatable crank arm 99 of which a crank pin 101 is fitted into an elongated pocket 102 formed in a block made integral with lever 96. It should be evident from this connection that pin 101 is slidable in pocket 102 to effect a reversible camming drive for oscillating lever 96 and pusher arm 90 thereon. Crank arm 99 is fixed to a shaft on which is also secured a sprocket wheel 103. A sprocket chain 105, provided to operatively engage wheel 103 obtains its drive from a sprocket wheel 107 fixed to a countershaft 109, which, as best seen in FIGS. 5 and 6, is mounted to rotate in pillow blocks 110 and 111 spatially arranged on a platform secured to the top of enclosure 2 above loading station 22. Idler sprockets 113, supported for rotation on an inclined shaft mounted in a bracket 114, carry chain 105 approximately midway between sprockets 103 and 107 and facilitate a right angle change in the direction of the drive.

Referring particularly to FIG. 5, it can be seen that one end of countershaft 109 also supports a crank disk 116 whose crank pin 117 operates Scotch yoke device 118 by engagement in a slot of the yoke's cam follower 120. Pairs of vertical rods 121 and 122 fixed to follower 120 and guided to slide in bearing blocks 123 and 124, secured to enclosure 2, restrain Scotch yoke 118 to longitudinal displacement. Scotch yoke 118 is thus enabled to control the operation of emplacement mechanism 30 by means of a clevis connection 125 pivotally connected to a guide rod 122 and depressor foot 94 of mechanism 30. Referring to FIG. 4, depressor foot 94 can be seen as the forward end of a curved lever arm pivotally mounted on a shaft 127 in a bracket fixed to a shelf 128 fixed within enclosure 2. Also pivoted on shaft 127, and arranged to overlie depressor foot 94, is a further lever arm 129 to which is attached pantographic orienting device 26. Lever arm 129 is thus arranged to normally support device 26 in position to carry its rollers 92 suspended under an unobstructed area bounded by the curved arm of the depressor foot lever. A chain 131 attached to an eyelet fastened to a central point on the back of lever 129, extends upward over a pair of pulleys bracketed to the frame of enclosure 2, and down to a pivotal fastening 133 at the upper end of a guide rod 121 of yoke device 118. As was previously explained, chain 131 facilitates the lifting of the pantographic rollers out from in front of a crab as yoke 118 is cranked down to drive the emplacing mechanism to complete the fixing of a crab to feed table 28.

Figure 7:
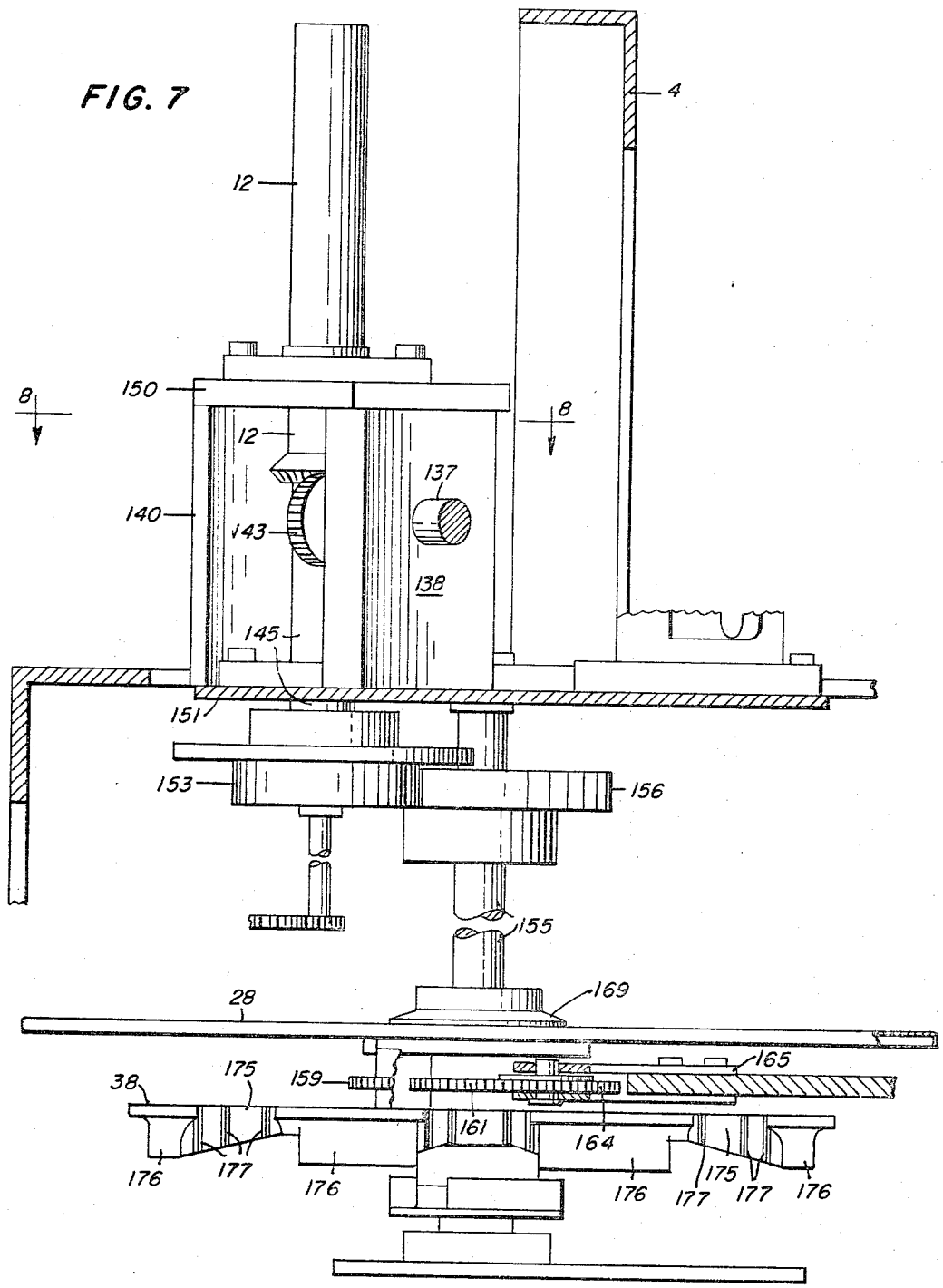
FIG. 7 is an elevational view of a fragmentary showing, partly in section, of power transmisison connections to driver devices actuating the crab feed table, transfer table, and coring punch mechanisms of the apparatus.

Countershaft 109 which activates the several crab manipulating devices at loading station 22, as was hereinabove explained, is in turn rotated by a drive transmitted thereto by a sprocket connection joining it to a shaft 137 taking power directly from main shaft 12. Referring generally to FIGS. 1, 5, 7 and 8, shaft 137 can be seen rotatably supported in bearing block 138 of a gear housing 140 fixed upon the upper frame members of enclosure 2. Shaft 137 is thus maintained substantially parallel to countershaft 109 to facilitate their sprocket connection comprising sprocket wheels 142 and 143, fixed to shafts 109 and 137, respectively, and a sprocket chain 144 linking the aforesaid wheels. Meshing bevel gears 146 secured to one end of shaft 137, and main shaft 12, transmit driving power from motor structure 9 to shaft 137 and thence to shaft 109 via the sprocket linkage therebetween. With particular reference to FIGS. 1 and 7, it can be seen that shaft 12 and an extension 145 thereof extend down from pulley drive 10 to pass through bearing supports maintained in plates 150 and 151 constituting the respective top and bottom surfaces of housing 140. On the end of shaft extension 145, which passes below plate 151, are mounted a lock or hold cam 153, and a drive pin 154 of a Geneva drive mechanism. As more fully shown in FIG. 8, the Geneva mechanism is seen to further include a shaft 155, parallel to main shaft 12, and supported for rotation in a bearing fixed to the underside of plate 151, on which the Geneva's follower 156 is carried and maintained in engagement with cam and drive elements 153 and 154. As is evident from the view in FIG. 8, Geneva follower 156 has four slots such that it is adapted to make a rapid quarter turn during a minor part of each revolution of the cam and drive elements in a manner that is well known in the art.

Referring once again to FIG. 7, it can be seen that to the extended end of shaft 155 is fixed feed table 28 such that the shaft constitutes a spindle for rotating the feed table. Consequently, in moving with shaft 155 under the control of the Geneva drive mechanism, table 28 is intermittently activated to make a quarter turn during approximately one-fourth of each time interval within which main shaft 12 completes a full turn. A sprocket connection, best seen in FIG. 8, between feed table 28 and transfer table 38 drives the latter around in synchronism with the feed table. Comprising this sprocket connection are a sprocket wheel 159 secured to a shaft 160 to which the transfer table is fixed, a further sprocket wheel 161 whose diameter is one-half of that of sprocket 159, and which is fixed to feed table shaft 155, a roller chain 162 engaging the sprocket wheels, and a sprocket idler 164, carried on a clevis mount 165, which take up the slack of chain 162 in a conventional manner. In view of the stepped-down drive to transfer table 38, it is evident that during each table displacement interval occurring within the period during which main shaft 12 makes a full turn, the transfer table is displaced one-eighth of a turn for each one-fourth of a turn then made by the feed table.

*Feed and transfer tables*

Figure 8:
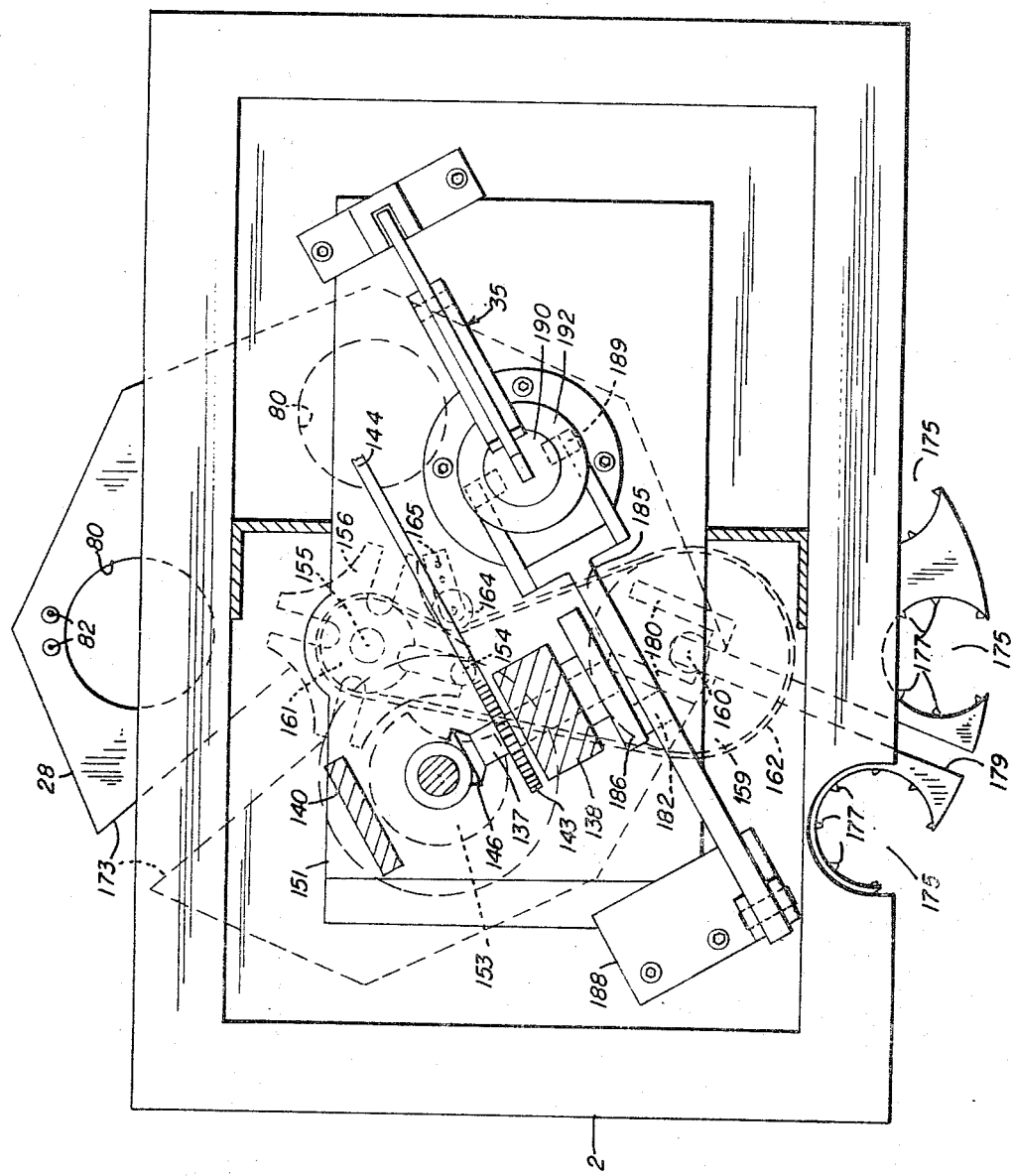
FIG. 8 is a top view showing in further detail the structural arrangement of the driver devices illustrated in FIG. 7, and in part includes a sectional view along line 8—8 of FIG. 7.

Provisions made to properly establish the position of table 28 in respect to its supporting shaft 155 include a disk-like collar 169 which as is evident from FIG. 7, also aids in clamping the table to this shaft. A relatively wide radial slot 173 extending to the central opening of the feed table, as shown in FIG. 8, allows the table to be easily removed for cleaning or repair by loosening the clamping collars 169, and subsequently readily remounted and secured on shaft 155 by tightening the collars. Transfer table 38 is generally circular and has equally spaced about its periphery eight partially circular recessed areas 175. These recesses may alternatively have an oblong shape wherein each is slightly wider than its depth along a table radius to obtain an opening better conforming to the shape of a crab core as will be hereinafter more fully explained. The underside of table 38 is made thicker in parts by wedge shaped protrusions 176 around the recessed areas to provide increased holding surfaces for the crab cores which these recesses are adapted to retain. In addition, six short knife edges 177 are vertically arranged around each recess surface to further aid its capability in securing a crab core. A slot 179 extending radially through table 38 merges with a squared central opening in the table whereby the table can be easily handled for cleaning and maintenance in a manner similar to that previously explained for feed table 28. In this connection shaft 160 is made to have a square cross-section along a short length thereof which is accommodated in the end of slot 179, and clamped to the transfer table by swingable camming latches 180 which are operative in adjacent cam slots passing through the table.

Referring once more to FIG. 8, it can be recognized that the feed and transfer tables are so disposed by reason of the particular arrangement of their respective shafts 155 and 160, that a feed table opening 80 and a transfer table recess 175 will be in substantial axial alignment at the end of each table displacement period of the main shaft cycle. As was previously explained, such displacement period is determined by an intermittent drive from a four point Geneva mechanism causing feed table 28 to make one-quarter turn while table 38 makes one-eight turn, which action occurs during approximately one-quarter of the main shaft cycle such that the tables remain stationary for approximately three-quarters of the cycle thereafter. It is during the time that the tables are thus maintained stationary that the several mechanisms of the apparatus are caused to co-act with respect to areas on one or both of the tables. Pusher and placing mechanisms 24 and 30 become effective with respect to the feed table 28 at crab input station 22, punch and punch stripper and clean-out knife and brush mechanisms 35 and 40 become effective with respect to feed table 28 and transfer table 38, respectively, at crab coring station 36, and core knock-out mechanism 46 becomes effective with respect to transfer table 38 at core discharge station 47.

*Punch and stripper mechanism*

The actuating drive to punch and stripper mechanism 35 is produced by a positive drive camming connection between a crank pin 182 and a specially contoured follower surface 183 formed internally on an operational control lever 185 of the mechanism. As best seen in FIGS. 8, 9 and 10 crank pin 182 is secured in a driver wheel 186 fixed to the end of power take-off shaft 137 extending outside of gear housing 140. Control lever 185 is pivoted at one end in a bearing bracket 188 fastened to the top of housing 2, and is constituted at its opposite end by a two prong forked linkage having connector pins 189 which pivot in short horizontal grooves formed in opposite sides of a vertically disposed cylindrical punch ram 190. A cylindrical housing 192 having relatively large open areas in the sides thereof, and which is fastened to the top of main housing 2 over an opening 193 therein, contains a sleeve 191 in which ram 190 is precisely disposed to reciprocate in vertical displacements through opening 193. Ram lever pins 189 enter the aforesaid grooves in ram 190 by passing through the open areas in ram guide 192.

A relatively deep vertical slot 195 passing down through the top of ram 190 for approximately one-third the length of the ram and into approximately three fourths the width thereof, joins an axial hole 196 opening through the bottom of the ram. Slot 195 receives a ram rod 197 which extends therefrom to pass through axial hole 196 wherein the rod is smoothly slidable. Made integral with the top of ram rod 197 is a C-shaped keeper element 198 which receives a ball formation constituting the end of a ram rod control arm 200, whereby keeper 198 flexibly couples the control arm to the ram rod. A punch assembly 202 for the punch and punch stripper mechanism as illustrated in FIGS. 9 and 10 is seen comprising an attachment to the base of ram 190. This attachment is accomplished by a close fitting juncture 204 comprising a channel slot formed in the base of ram 190 having internal grooves in which is keyed a conforming element made as an integral part of a relatively thick cylindrical disk 206 at the head of punch assembly 202. On a slightly reduced rim portion of disk 206 is fitted a downwardly extending sleeve 208 whose base part is defined by a plurality of regularly spaced relatively large serrations having pointed projections 210, constituting the cutting edges of punch assembly 202.

The stripper component of mechanism 35 includes a stripper block 212 which is maintained in operable position within the sleeve 208 of the punch by means of a reciprocative rod 214 to which block 212 is securely fastened. The underside of block 212 is especially contoured to allow it to substantially fully contact the irregular surfaces of the ventral side of a crab in a manner and for a purpose to be hereinafter more fully explained. Rod 214 passes through a central opening traversing disk 206, whereby it provides an extension from punch assembly 202 which is attachable to ram rod 197. This juncture between the rods is accomplished by meshing surfaces of a grooved channel and a keying element as was heretofore explained in connection with the punch assembly and its ram. It should therefore be evident that punch assembly 202, including the stripper components thereof, can be detached from the ram and the rod therein by drawing down the rod structure so as to align the channel and keying surfaces of the stripper rod juncture with the corresponding surfaces of the punch and ram juncture, and displacing punch assembly 202 in a radial direction whereby the keying elements of head disk 206, and rod 214 are slid from the aligned channel grooves in ram 190 and rod 197.

Provisions made to maintain punch assembly 202 in operative position relative to the feed and transfer tables of the apparatus, includes a punch mount unit 220 which is normally held securely clamped to a lower structural member 227 of housing 2. As can be seen from the showing in FIG. 9, punch mount 220 is essentially a rigid C-frame comprising a base plate 221 having a circular opening 222 adjacent an outer edge, and a somewhat thicker head plate 223, spaced above base 221 to overlie it in a parallel relationship thereto, having a circular opening 224 which in this instance is defined by a sleeve insert of plate 223 disposed in alignment over base opening 222. Punch assembly 202 is carefully fitted to occupy opening 224, so that it can be smoothly reciprocated therein. Securely fitted into base opening 222 of the mount is a punch die 228 which is adapted to coact with punch cutter 208 of assembly 202 so as to implement the core cutting action thereof wherein the die functions to shape the core produced. Clamping elements used to secure punch mount 220, in the manner heretofore described, include an adjustable vise 225 wherein beveled blocks are applied to wedge against beveled edges on base plate 221 of the mount. Vise 225 is operable to facilitate interchanging the punch mounts as will be hereinafter more fully explained.

When properly placed and clamped in housing 2 punch mount 220 is adapted to locate its openings 222 and 224 directly under housing opening 193, and over an opening 226 in mount support member 227 of housing 2. As a result, during each punch cycle or revolution of main shaft 12, feed table 28 is made operative to bring one of its openings 80 in the space between plates 221 and 223 of punch mount 220, and in line with the openings therein as illustrated in FIG. 9. Concurrently therewith, transfer plate recess 175 traversing the space immediately below housing member 227 is brought into alignment with opening 226, and thus also into alignment with the openings in punch mount 220, as illustrated in FIG. 10.

During the greater part of the cyclic operation of punch and punch stripper mechanism 35, the stripper structure including block 212 thereof moves together with the ram and punch assembly elements. However, following a downward travel of the ram structure wherein punch cutter 208 has been moved to enter die 228, and made effective to cut a core from the crab held against a feed table opening 80, the stripper block 212 is caused to travel further down relative to the sleeve of punch cutter 208, and the ram structure fixed thereto. Consequently, the contoured surface of stripper block 212 is caused to bear down on the crab core so as to push it through opening 80 of the feed table and into a peripheral recess 175 of the transfer table. This further travel of block 212 is effectuated by a limited drive thereto obtained from a cooperation between ram rod control arm 200, pivotally mounted on a pin 201 fixed between horizontal extending support brackets 230 secured to an upper portion of ram 190 at opposite sides of deep notch 195 therein, and vertically aligned stops 232 and 233 spaced a predetermined distance apart on a standard 234 secured to an upper member of housing 2. A stud 240 fixed to the tail end of arm 200 is thus arranged to be displaceable in a slot 241 defined within standard 234 by the stop blocks 232 and 233 thereof. It now can be seen that when movement of the cycling ram structure displaces brackets 230 and carried stud 240 through slot 241 to where it is stopped by contact with block 233, as indicated by dashed lines in FIG. 9, further downward travel of the ram and brackets causes control arm 200 to pivot counterclockwise, as viewed in the figure, whereby ram rod elements 197 and 214 coupled to control arm 200 by keeper 198 are displaced downwardly relative to the general ram structure. Accordingly, stripper block 212 fixed to the end of rod 214 is moved to a nadir position as shown in FIG. 10, and made effective to dislodge the crab core from cutter sleeve 208 and implant it into a recess 175 of transfer table 38. A similar but reverse cooperation is effectuated between the stripper components and the ram punch components upon the return movement of the ram structure. No relative movement between the stripper and ram punch components occurs until stud 240 contacts and is stopped by block 232 whereafter control arm 200 is pivoted clockwise about pivot pin 201, and stripper block 212 is withdrawn into cutter sleeve 208 to a position as shown in FIG. 9.

Reference to the dash line showing of keeper 198 and control arm 200 in FIG. 9, makes evident the facility with which the stripper linkage train can be broken so that the punch mount 220 may be removed and replaced from the apparatus as required for cleaning, adjusting or maintaining it. The space normally provided between disk 206 and stripper block 212 allows rod 197 and the ball end of control arm 200 to be raised sufficiently above the pivot point at pin 201 to permit removal of the ball from its coupling in keeper 198. As a result, coupled rods 197 and 214 can be thereafter lowered together with block 212 so that the slotted juncture between the rods can be aligned with the corresponding slotted juncture between the ram and punch assembly whereby the complete separation of the punch mount 220 from the apparatus is made possible in a manner heretofore explained.

*Clean-out knife and brush mechanism*

As was previously indicated, a crab core received and confined in a transfer table recess 175 is disposed such that its carapace is exposed in the underside opening of the recess. The crab core is thus in position to have its main visceral cavity, which lies directly beneath its carapace, opened and the viscera therein cleaned away along with the carapace by the clean-out knife and brush mechanism 40 whose details are shown in FIGS. 12 and 13. This mechanism is arranged to become effective within a transfer table recess 175 upon the recess being stationed under the punching and stripping mechanism 35. Mechanism 40 comprises a housing 250 fastened within a recess of a plate-like platform 251 fixed to the base of the apparatus, so as to align a relatively wide opening 252 through a partially curved top section thereof with any transfer table recess reaching the crab coring station. A rectangular chute-like portion 255 of housing 250, extends downwardly from opening 252 and terminates in a drop opening 256 under which can be set a receptacle to collect the material cleared from the crab cores. Aligned openings in opposite side walls of housing 250 contain bearings 258 and 259 in which is secured a drive shaft 260 for rotating the knife and brush devices of clean-out mechanism 40.

Referring particularly to FIG. 13, it can be seen that there are supported on shaft 260 a knife mount 262, and on either side thereof brush mounts 263 and 264. A chisel-like knife blade 265 is detachably fastened to a raised segment of mount 262 by means of a large screw 266, so as to extend out beyond the forward edge of the mount. A number of parallel rows of bristles 267, made of nylon or the like, are radially fastened in the wide arcuate faces of the bearing blocks constituting the brush mounts. These brushes are for the removal of gills. Bristles 267 are also thereby disposed behind knife blade 265 so as to apply their cleaning action directly upon the results of the cutting and scraping action of the knife. Shaft 260 is caused to rotate throughout the operational cycles of the apparatus by a disengageable toothed coupling 268 rotated by a shaft 269 emanating from a gear box 270 securely bolted to platform 251. A rotative drive is transferred to box 270 by a vertically disposed shaft 272 having fixed to the upper end thereof a sprocket which is driven by a chain linkage from a sprocket on main shaft 12. Coupled shaft 269 is driven by vertical shaft 272 through a helical gear connection 273 operating in box 270, and extends outside the far side of the gear box where the shaft provides an axial support for a crank wheel 275. A crank pin 276 fixed to wheel 275, is secured in an eye-loop at the end of a connecting rod 277 which operates the core knock-out mechanism 46, in a manner to be hereinafter more fully explained.

A pair of angle flanges 279 and 280, of different lengths, respectively attached to the left and right sides of housing 250, as seen in FIG. 13, are adapted to contact lower and upper surfaces, respectively, of platform 251 whereby the flanges are aids to a proper insertion of cleaning mechanism 40 into the apparatus. The recess in which housing 250 is received for connection to platform 251 is enlarged slightly by a marginal space 282 so as to facilitate the engagement of coupling 268 by shifting housing 250 and shaft 260 therewith to the right upon axially aligning shafts 260 and 269. A substantially L-shaped lever 283, pivotally connected by fastener 284 to the underside of platform 251, is provided to turn a camming surface 285 thereon toward housing 250 to wedge against the edge of flange 279 so as to securely clamp the housing and its parts in predetermined operative positions.

Water spray devices shown generally in FIG. 12, are operatively associated with the clean-out knife and brush mechanism 40 to constantly cleanse the knife and brush as well as the punch. One such device includes a specially formed bearing block 290 located under member 227 of housing 2, and closely adjacent to opening 252 of housing 250. Opening on the forward face on block 290 are two upwardly inclined spray passages 294 and 295 which are aimed to spray within and immediately below table recess 175, whereby they direct water to wash knife 265 and bristles 267 when these parts move through the recess. A threaded opening passing through the rear face of block 290, and connecting with passages 294 and 295 therein, receives a nozzle unit 296 whereon a threaded collar part engages with the screw threads of the opening. A second washing device comprises a short conduit 297 protruding out of housing chute 255, near the top thereof, to which a spray unit 299 is fixed so as to spray water across the chute and wash any visceral matter tending to adhere in the chute down through its bottom opening 256. A further washing device used in the apparatus to clean the punch and other parts contiguous thereto, comprises a perforated partial ring 301 having a section supported upon a relatively deep undercut shoulder 303 of block 290 immediately below lower member 227 of housing 2. Ring 301 is thus located to partly encircle opening 226 in member 227 so as to direct spray from its perforations toward the underside of punch die 228.

Pipes leading to all three spray devices described are connected to a source of water supplied through a valve actuated by an electric solenoid (not shown). An intermittent operation for the valve actuating solenoid is obtained by a camming device, fixed to an upper part of main shaft 12, which controls a switch in the solenoid circuit of the valve actuator. It is important to the operation that a minimum of water to be used to accomplish the washing since clean water for the purpose may be scarce and a suitable disposal of considerable waste water may be undesirable without first processing such waste.

The several distinct functions hereinabove described as occurring at the crab coring station 36 all take place in a predetermined sequence during one operational cycle of the apparatus. In the exemplary embodiment of the apparatus disclosed herein, the driving force sustaining a cyclic operation is produced by one revolution of main shaft 12 which requires approximately one second. The aforesaid sequence will be more readily understood by referring to FIG. 11 which shows superimposed on ram control lever crank wheel 186, and crank pin 182, a diagrammatical representation of the operational cycle. As hereinbefore explained, crank wheel 186 makes a complete revolution in correspondence with the rotation of main shaft 12, and hence a full operational cycle is measurable by reference to the angular segments constituting the circle representing the path of crank pin 182. Accordingly, FIG. 11 is marked to indicate the functions associated with the position of the crank pin in its circular path. Moreover, consideration is hereinafter given to these functions by reference to their relationships to the operative effects produced by the camming action of crank pin 182 in its coaction with cam follower surface 183 in ram control lever 185.

In traversing the approximately ninety degrees rotation from point A to B, as shown in FIG. 11, crank pin 183 moves across an arcuate segment 320 of follower surface 183, as shown in FIG. 9, without causing displacement of ram 190. However, during the period of time in which the crank pin passes through this initial camming contact, feed table 28 and transfer table 38 are adjusted by the action of Geneva drive devices 154 and 156 to place the openings and recesses thereof at work stations in the apparatus. At point B, feed table opening 80, upon which a crab is held for processing, and a transfer table recess 175 have been brought to operative positions at crab coring station 36. Since the Geneva drive is thereafter ineffective to move the feed and transfer tables until the start of the next cycle, the crab on the feed table remains set within punch mount 220 between punch assembly 202 and punch die 228. In rotating approximately sixty degrees from point B to point C, crank pin 182 acts on a substantial portion of a slotted section 322 of follower surface 183, whereby lever 185 rotates clockwise, as viewed in FIG. 9, drawing ram 190 down and causing punch cutter 208 connected thereto to cut through the crab's ventral cover and carapace until the indented teeth 210 of the cutter reaches the bottom of punch die 228, as shown in dotted lines in FIG. 9. By moving approximately fifty degrees from point C to point D, crank pin 182 completes its driving displacement in slotted section 322, wherein it further moves the ram so that ram rod control arm 200, which having brought its stop pin 240 into contact with block 233, is then pivoted counterclockwise about pin 240 to displace stripper block 212 out from sleeve 208 for pushing the crab core from the sleeve into transfer table recess 175. Passing from point D to point E, the crank pin rides on a lower arcuate surface 324, as illustrated in FIG. 10, and is again ineffective to move the ram control lever. During this dwell spanning about fifty to sixty degrees of crank pin rotation knife and brush mechanism 40 passes across the full width of opening 252 in clean-out housing 250 whereby the carapace remaining on the crab core and visceral matter of the crab are cleared away with the aid of thin streams of water coming from the nozzles of the washing devices associated with housing 250. Movement of crank pin 182 through about sixty degrees from point E to point F, finds the pin acting in a further slotted camming section 326 of follower 183, to raise ram lever 185 carrying ram 190 and its appertaining parts upward so as to withdraw cutter sleeve 208 from the punch die. The remaining rotation of crank pin 182, from point F to the cycle initiate point A, is effective to further raise the ram lever and ram, and thereby to bring pin 240 on the far end of ram rod control arm 200 against stop block 232 such that the arm is pivoted clockwise about the pin to raise punch stripper block 212 into an initial position within the hollow of punch cutter 208.

Upon completion of an operational cycle at crab coring station 36, a core thereat is depleted of its carapace and the fat, eggs, gills and other viscera covered by the carapace, and ready to be removed in transfer table recess 175 to succeeding stations where it is processed further. Thus, the start of a succeeding cycle finds transfer table 38 carrying the punched core toward processing station 45 where it is brought under a hard bristle brush which acts to clean the ventral surface of the core. Referring particularly to FIG. 14, brush 330 having multistrands of bristles, can be seen fixed to a shaft 332 journaled for rotation in a drop hanger structure 335. A short length of angle iron 336 bolted to an upper frame member of enclosure 2, is also bolted to a header bar 337 of hanger structure 335 whereby the latter is located to maintain brush 330 operatively effective in respect to the indexed position of transfer table recess 175 at station 45. Brush 330 comprises a cylindrical mount 341 accommodating the bristles thereof and which rotates with shaft 332 between spaced apart bearing hubs 339 and 340 of hanger structure 335. Hubs 339 and 340, which are dependent from the ends of rigid struts made integral with bar 337, are additionally held by a lateral tie brace 342 fastened to hub 340 and to a block fixed to enclosure 2.

Shaft 332 extends through hubs 339 and 340 and is provided with a collar 343 fixed to one end of the shaft so as to contact a bearing element in hub 339. To the other end of shaft 332 is fixed a bevel gear 346, which contacts a bearing element in hub 340. Driving gear 346 is a complementary bevel gear 347 fixed on drive shaft 272 disposed vertically between a sprocket drive connection from main shaft 12 and a gear case 270 fastened to base platform 251, as was previously noted. Brush 330 is thus accommodated to be continuously rotated by the main shaft drive during the cyclic operations of the apparatus whereby the brush functions to clean the ventral surface of each crab core positioned thereunder following the periodic cyclic adjustments of transfer table 38. A chute 349, shown in FIG. 2 arranged adjacent to the pertinent transfer table recess 175, receives the waste from brush 330 and directs it to a waste container placed nearby.

Core knock-out mechanism

Two cyclic displacements of transfer table 38 following completion of the ventral shell removal operation at station 45, locates the crab core at discharge station 47. When received at station 47, a crab core is still held fast in transfer table recess 175 by the several vertical knives 177 arranged around the recess wall. Hence the application of a substantial force is needed to cleanly displace the core from the recess. Referring again to FIG. 14, discharge station 47 is seen as being equipped with core knock-out mechanism 46 which includes a plunger device 352 slidably supported in bracket plates 354 and 356 secured to top and side frame members of enclosure 2. An elongated rod 358 of the plunger device is maintained for reciprocating axial translation in vertically aligned holes through bracket plates 354 and 356. A flat, circular platen disk 360 fastened to the lower end of rod 358 is displaced with the rod during the plunger's operation whereby the disk is adapted to move through the transfer table recess 175 brought into register with the plunger by the cyclic indexing of the transfer table.

Provisions to operate plunger device 352 includes a crank actuated, pivotally mounted, oscillating beam 365 extending across the side of enclosure frame 2 on the discharge end of the apparatus. A bearing bracket 367 fastened by screws adjacent to an inner corner of the vertical framing on the aforesaid enclosure side constitutes a support to which one end of beam 365 is pivotally connected. The opposite end of beam 365 is joined to plunger rod 358 by a flexible cross-head juncture wherein the beam's end is formed as a clevis connector having fixed between its extended arms two axially aligned pins 370 which fit into short slots on opposite sides of a collar 371 fastened to the rod approximately mid-way between the ends thereof. This construction allows pins 370 to slide as necessary in respect to the collar slots as well as turn therein when beam 365 is oscillated about its pivot at bracket 367, whereby plunger device 352 is reciprocated. An oscillatory drive for beam 365 is obtained by the action of connecting rod 277 which, as was previously explained, is driven in synchronism with the drive to the clean-out knife and brush mechanism 40. Connecting rod 277 is articulated to beam 365 by means of an eye-nut bearing element 373 which is pivotally joined to a part of the beam at a relatively short distance from beam support bracket 367. A similar pivotal bearing connector 375 joins the opposite end of connecting rod 277 to crank pin 276. From the foregoing it should be evident that in each operational cycle of the apparatus connecting rod 277 is reciprocated by the crank drive applied thereto from shaft 269, whereby it acts to oscillate beam 356 which in turn actuates plunger device 352 to reciprocate in a transfer table recess. Accordingly, platen disk 360 of the plunger device is applied to contact each crab core set thereunder so as to slide it off knives 277 tending to retain it in a transfer table recess whereby the core drops into discharge chute 48 for collection in suitable containers.

Punch assembly modifications

Referring to FIG. 15, it can be seen that the working elements of punch assembly 202 are characterized by a cardioid-like shape wherein punch cutter sleeve 208 is especially formed to have a cusped segment 380. The location of cutting segment 380 in respect to any crab properly situated in crab coring station 36, is such that the bony structure behind the backfin lump is cut away with a minimum loss of meat so that the lump meat can be removed later by mechanical means. As indicated in the figure, punch stripper block 212 is formed to have a cardioid contour like that of the punch sleeve 208, whereby it can readily slide relative to the surface in the hollow of the sleeve. Punch die 228, shown in FIGS. 9 and 10, also has a matching cardioid-like contour on its upper rim surface 382 such that the outer surface of sleeve 208 can effectively cooperate therewith during the punch stroke in each operational cycle. The preliminary sorting as to size of the crabs before they are loaded on to conveyor 8 facilitate the use of the apparatus described herein to process crabs of approximately the same size during any particular run of the apparatus without further adjustments. Crabs sorted into significantly different size ranges can thereafter be processed in the apparatus when a punch assembly 220 of an appropriate size, and a punch die 228 of corresponding size are substituted for the punch and die previously in the mount. Removing and replacing mount 220 is easily done in a manner previously disclosed in connection with references to the cleaning and maintenance of these parts.

Obviously other modifications and variations in the details of the present invention are possible in light of the disclosure herein. It is therefore understood that within the scope of the appended claims the invention may be practiced otherwise than as specifically described.

What is claimed is:

1. An apparatus for processing crabs to facilitate the subsequent extraction of their lump meat, comprising a plurality of crab processing stations whereat individual crabs are manipulated to effect different phases of said processing thereon, intermittently operable means to deliver individual crabs to each of said stations in a predetermined sequence whereby each crab is received in turn at each of said stations, a conveying means having fixed thereto at uniformly spaced intervals along the extended length thereof a multiplicity of crab retaining elements, means driving said conveying means to effect the discharge therefrom of individual crabs at a position within a first of said stations, said intermittently operable crab delivery means comprising a rotatable carrier means having a plurality of openings symmetrically arranged thereon adapted to receive crabs from said conveying means and further crab retaining elements adjacent each opening, said first station including a plurality of means concurrently driven to become sequentially effective to impel a crab discharged thereat toward a predetermined location over one of said openings in said carrier means situated at said first station, orient said crab in respect to said carrier so as to locate said crab directly over said one opening, and forcibly set said crab upon said one opening whereby said further retaining elements hold said crab on said carrier in a predetermined disposition relative thereto, said intermittently operable crab delivery means further comprising a rotatable crab transfer means having a plurality of peripheral recesses symmetrically arranged thereon and securing elements fixed in each of said recesses, a primary driving means, means rotating said carrier means including an intermittent drive device, a means for transmitting a driving force from said primary driving means to said means rotating said carrier means, means for rotating said transfer means, other driving force transmitting means connected between said means rotating said transfer means and said means rotating said carrier means operable to intermittently drive said transfer means in synchronism with said carrier means, a second of said stations comprising a means operable to punch a core out of a crab affixed upon any carrier opening situated at said second station and encase said core by reciprocating through said situated carrier opening, means operatively associated with said core punch and encasing means to strip said punched core therefrom and shift said core into any recess of said transfer means situated at said second station, constantly operable means at said second station to clean the carapace and viscera from said crab core in said situated recess, a third of said stations comprising a constantly operable means to clean the ventral covering remaining on a crab core in any recess of said transfer means situated at said third station, a fourth of said stations comprising a collector means including a chute leading thereto, and means operable to dislodge a crab core from any recess of said transfer means situated at said fourth station and impel said core into said chute by reciprocating through said situated recess, a further driving force transmitting means connected to said primary driving means and constantly effective to concurrently actuate said plurality of means at said first station, a still further driving force transmitting means connected to said primary driving means arranged to constantly operate said cleaning means at said second and third stations, and means including a reciprocating linkage operatively connected to said still further driving force transmitting means to transmit a driving force to said crab core dislodging and impelling means.

2. The crab processing apparatus of claim 1 wherein said carrier means and said transfer means are substantially flat table structures rotatably supported separately on spaced apart shaft means, a Geneva drive mechanism constituting said intermittent drive device of said means to rotate said carrier means, said Geneva mechanism having driver and cam locking elements thereof connected directly to said means transmitting a driving force from said primary driving means to said means rotating said carrier means, and a driven follower element thereof fixed to said shaft of said carrier table structure, said other driving force transmitting means comprising sprocket wheels of different diameters fixed to said spaced apart shafts, and sprocket drive means operatively connecting said wheel whereby said transfer table structure rotates at one-half the angular velocity given said carrier table structure by said intermittent drive thereto.

3. The crab processing apparatus of claim 1 wherein said conveying means comprises means flexibly supporting a spatula element extending upwardly in front of the discharge end of said conveying means and over a carrier opening situated at said first station, and said plurality of means included at said first station comprises an oscillatory pusher arm operable to contact the back-fin end of a crab at said conveying means discharge end and shift said crab on to said spatula element, a pair of rollers operatively arranged on a pivotally supported pantographic device receiving between them said shifted crab to effect an orientation thereof over said situated carrier opening, a pivotally supported placement bar and reciprocating means linked to said bar and operable by a vertical longitudinal displacement thereof to forcefully apply said bar against the ventral surface of said crab so as to displace said crab downwardly upon said situated carrier opening whereby the crab is affixed to the carrier by said further retaining elements piercing at least the carapace of said crab.

4. The crab processing apparatus of claim 3 wherein said further driving force transmitting means comprises spaced apart bearing structures separately supporting for rotation a primary shaft and a counter shaft driven therefrom, gearing means for transmitting a drive from said primary driving means to said primary shaft, a first sprocket drive means for transmitting a rotative driving force from said primary shaft to said counter shaft, a first crank means provided with a pin made operatively effective by its sliding contact in a cam slot formed in said pusher arm to oscillate said arm, a second sprocket drive means for transmitting a driving force from said counter shaft to rotate said first crank means and the pin thereof, said linked reciprocating means having a cam slot therein, a second crank means fixed to said countershaft and provided with a pin operatively effective in said cam slot to drive said reciprocating means to actuate said placement bar, a pulley rotatably mounted in an upper part of said apparatus for supporting a chain connecting an upper end of said reciprocating means and said pantographic device whereby downward vertical displacement of said reciprocating means draws said chain down to cause an upward pivotal movement of said pantographic device.

5. The crab processing apparatus of claim 1 wherein said means operable to punch a crab core and encase said core comprises a ram member constrained to slide longitudinally in a sleeve constituted by an open passage through a fixed housing in said apparatus, a hollow punch cutter having a closed line of cutting teeth defining an opening at one end thereof detachably connected to a lower end of said ram member, an elongated ram lever having one end thereof pivotally supported in a fixed bracket and as integral parts of the other end thereof coupling elements which are operative to slide and pivot in openings on the outer surface of said ram member, a power transmission shaft including gearing means for transferring a drive from said primary driving means to said transmission shaft, a camming drive including a crank device fixed to said transmission shaft, a cam follower surface constituted by a plurality of control surfaces defining an opening in said ram lever, said crank device including a driver pin extending into said lever opening and operably by said transmission shaft to drivingly engage said control surfaces to displace said lever and the coupling elements thereof in an arcuate path whereby the ram is intermittently slid a predetermined distance in opposite directions within said housing sleeve so as to reciprocate the punch cutter connected thereto through an opening in said rotatable carrier and contiguous to a recess of said transfer means situated at said second of said stations.

6. The crab processing apparatus of claim 5 wherein said ram member supports for reciprocatory displacement in a longitudinal passage therethrough a rod extending between the hollow part of said punch cutter and an aperture in the upper part of said ram member, a disk attached to said rod in said hollow part, and slidable along approximately the length of said part, said disk having facing said punch cutter opening a surface adapted to forcibly contact a crab core encased in said punch cutter and displace said core therefrom into a said transfer means recess, an extension formed integral with the ram member adjacent the aperture therein providing a bracket supporting for rotational displacement thereon a lever arm having one end thereof in a ball-joint connection with the end of said rod in said ram member aperture, a stand having a longitudinal slot wherein the other end of said lever arm is freely movable between two spaced apart stop surfaces defining the ends of said slot, whereby the longitudinal displacement of said ram member and said extension thereof close to either end of such displacement positions the said other end of said lever arm to contact one of said stop surfaces and produce limited rotation of said lever arm which acts to displace said rod and said disk attached thereto relative to said ram member and the punch cutter attached thereto.

7. The crab processing apparatus of claim 6 wherein said disk surface facing said punch cutter opening is formed with a cavity mold shaped to substantially fit the ventral surface of a crab.

8. A crab processing apparatus of claim 5 wherein said plurality of control surfaces defining said ram lever opening includes a pair of spaced apart straight slots joined by a pair of oppositely curved arcuate surfaces whereby pivotal displacement of said ram lever and longitudinal displacement of said ram member therewith is accomplished only by the coaction of said crank device driver pin with either of said straight slots.

9. The crab processing apparatus of claim 1 wherein said constantly operable cleaning means at said second station includes a knife and brush assembly, a housing having a partial upper opening located below said situated recess of said transfer means and contiguous thereto, and a full lower opening, bearing means supporting for rotation between said openings a housing shaft having fixed thereto said knife and brush assembly, said assembly including a centrally arranged knife on which a knife edge is disposed parallel to said housing shaft and movable in an arcuate path within said recess, separate brushes fixed to said housing shaft on opposite sides of said knife, said brushes having radially extending bristles which define arcuate areas between which reside the knife edge, said still further driving force transmitting means comprising a driver shaft, said housing shaft having a portion extending outside said housing, and means detachably coupling said housing shaft extension and said driver shaft whereby said housing shaft is rotatable by said still further drive force transmitting means to constantly rotate said knife and brush assembly to pass said knife edge and said bristles through said situated transfer means recess.

10. In an apparatus for processing crabs, a cyclically operable arrangement to reduce each said crab to a crab core comprising a means to punch said crab to form said core including a punch cutting device, an intermittently effective actuating drive reciprocating said cutting device, said actuating drive including a ram mechanism having a bolt member slidable in a fixed sleeve, a driven pivotal member having an oscillatory end thereof forked with two prongs, corresponding pins affixed to said prongs and fitted into short grooves on opposite sides of said bolt to effect an articulated linkage for driving said bolt through regularly recurring longitudinal reciprocating displacements thereof, releasable connective means fixedly coupling said cutting device to said bolt, intermittently displaceable crab carrier means having openings therein and means to secure said crab over one of said openings, said carrier means being operable to situate and maintain said crab in a predetermined position relative to said punch cutting device whereby said actuating drive displaces said cutting device through said opening to cut a core out of said crab.

11. In the crab processing apparatus of claim 10, said means to punch said crab further including a punch mount having a pair of spaced apart plates in which are singular openings that are axially aligned, one of said plates supporting in said opening thereof a punch die having an opening therein, and the other of said plate openings supporting a sleeve wherein said cutting device is reciprocal to pass through said opening in said punch die, releasable means fixedly fastening said punch mount in said apparatus so as to locate said opening in said crab carrier when in predetermined position between said support plates and in axial alignment with said openings in said plates whereby said carrier opening is disposed to receive therethrough said cutting device.

12. In the crab processing apparatus of claim 10, said punch cutting device comprising a substantially cardioid shaped hollow sleeve, one end of said sleeve having a linear arrangement of indented cutting edges spaced along an edge thereof, and the other end of said sleeve having fixed thereto said releasable coupling means securing said punch cutting device to said actuating drive for reciprocating said punch cutting device.

13. In the crab processing apparatus of claim 10, said punch cutting device comprising a hollow sleeve, a block having a uniformly reduced portion, one end of said sleeve having a linear arrangement of indented cutting edges uniformly spaced along the entire edge thereof, and the other end of said sleeve having said reduced portion of said block tightly fitted therein whereby said sleeve is fixed to said block, a surface of said block outside said sleeve having a coupling element formed integral therewith, said bolt member having on one end surface thereof a coupling element formed integral therewith to complement the said coupling element on said block, said bolt member being operable to reciprocate said cutting device through a releasable attachment between said complementary coupling elements on said block and bolt member.

14. In the crab processing apparatus of claim 10, means to intermittently displace said crab carrier means, said carrier displacing means including drive means supporting said carrier means thereon, a primary power drive, an intermittently effective power transmission device operatively connecting said primary power drive to said carrier supporting drive means, said carrier means comprising a substantially circular disk having a radial slot, said carrier supporting drive means residing at the inner end of said slot, and fastening means operatively connected to said disk releasably securing said disk to said carrier supporting drive means.

15. An apparatus for processing crabs to facilitate the subsequent extraction of their meat, comprising a plurality of crab processing stations whereat individual crabs are manipulated to effect different phases of said processing thereon, a first displaceable carrier means, a first processing station having means to releasably attach individual crabs to said first carrier means in a predetermined position relative thereto, intermittently operable means to displace said first carrier means, a second processing station having means operable to punch a core out of a crab disposed thereat by displacement of said first carrier means, reciprocatory means actuating said crab core punch means, a second displaceable carrier means including means drivingly connecting said intermittently operable means to displace said second carrier means, a further means at said second processing station interacting with said crab core punch means to transfer a punched crab core from said first carrier means to said second carrier means, means fixed to said second carrier means to releasably retain therein said crab core transferred thereto, crab cleaning means operable at said second processing station to remove the carapace and viscera thereat from said crab core retained in said second carrier means, a third processing station having means operable to clean the ventral covering remaining on a crab core positioned thereat by displacement of said second carrier means, a fourth processing station including a receiver for said crab cores and means operable upon a crab core positioned at said fourth processing station by said second carrier means to dislodge said crab core from said second carrier means into said receiver, and a cyclically operable means drivingly connected to said intermittently operable means and said reciprocatory means.

References Cited

UNITED STATES PATENTS

| | | | |
|---|---|---|---|
| 2,502,091 | 3/1950 | Harris et al. | 17—4 |
| 2,522,578 | 9/1950 | Johnson | 17—45 |
| 2,771,631 | 11/1956 | Hiller | 17—2 |
| 3,151,351 | 10/1964 | Reinke | 17—2 |
| 3,245,105 | 4/1966 | Tolley | 17—2 |

LUCIE H. LAUDENSLAGER, *Primary Examiner.*